US010018050B2

(12) United States Patent
Perrot et al.

(10) Patent No.: US 10,018,050 B2
(45) Date of Patent: Jul. 10, 2018

(54) TURBOMACHINE ROTOR BLADE (71) Applicant: SNECMA, Paris (FR)

(72) Inventors: Vincent Paul Gabriel Perrot, Moissy-Cramayel (FR); Julien Cointe, Moissy-Cramayel (FR); Jean-Francois Rios, Moissy-Cramayel (FR)

(73) Assignee: SNECMA, Paris (FR)

( * ) Notice: Subject to any disclaimer, the term of this patent is extended or adjusted under 35 U.S.C. 154(b) by 459 days.

(21) Appl. No.: 14/390,566

(22) PCT Filed: Apr. 3, 2013

(86) PCT No.: PCT/FR2013/050735
§ 371 (c)(1),
(2) Date: Oct. 3, 2014

(87) PCT Pub. No.: WO2013/150243
PCT Pub. Date: Oct. 10, 2013

(65) Prior Publication Data
US 2015/0118059 A1 Apr. 30, 2015

(30) Foreign Application Priority Data
Apr. 4, 2012 (FR) ...................................... 12 53108

(51) Int. Cl.
F01D 5/14 (2006.01)
F04D 29/32 (2006.01)
(Continued)

(52) U.S. Cl.
CPC ............... *F01D 5/141* (2013.01); *F01D 5/14* (2013.01); *F04D 19/002* (2013.01);
(Continued)

(58) Field of Classification Search
CPC ... F01D 5/12; F01D 5/14; F01D 5/141; F04D 29/384; F04D 29/386; F04D 29/324;
(Continued)

(56) References Cited

U.S. PATENT DOCUMENTS

| | | | |
|---|---|---|---|
| 4,012,172 A | 3/1977 | Schwaar et al. | |
| 6,071,077 A | 6/2000 | Rowlands | |

(Continued)

FOREIGN PATENT DOCUMENTS

| | | |
|---|---|---|
| EP | 1 333 181 A1 | 8/2003 |
| FR | 2 851 798 A1 | 9/2004 |
| GB | 680036 | 10/1952 |

OTHER PUBLICATIONS

International Search Report dated May 29, 2013, in PCT/FR2013/050735, filed Apr. 3, 2013.
(Continued)

*Primary Examiner* — Igor Kershteyn
*Assistant Examiner* — Brian P Wolcott
(74) *Attorney, Agent, or Firm* — Oblon, McClelland, Maier & Neustadt, L.L.P.

(57) ABSTRACT

A turbomachine rotor blade including a blade root and a blade tip spaced apart by a blade height, including at least one intermediate segment between the blade root and the blade tip that presents forward sweep over at least 50% of the blade height, and a distal segment with backward sweep between the intermediate segment and the blade tip, the distal segment also presenting a positive tangential angle of inclination.

10 Claims, 5 Drawing Sheets (51) Int. Cl.
*F04D 19/00* (2006.01)
*F04D 29/38* (2006.01)

(52) U.S. Cl.
CPC .......... *F04D 29/324* (2013.01); *F04D 29/384* (2013.01); *F05D 2220/36* (2013.01); *F05D 2250/38* (2013.01); *Y02T 50/673* (2013.01)

(58) Field of Classification Search
CPC ......... F05D 2240/302; F05D 2240/303; F05D 2250/38; F05D 2240/301
See application file for complete search history.

(56) References Cited

U.S. PATENT DOCUMENTS

| | | | |
|---|---|---|---|
| 6,290,465 B1* | 9/2001 | Lammas | F01D 5/141 416/219 R |
| 6,554,564 B1 | 4/2003 | Lord | |
| 7,108,486 B2* | 9/2006 | Talbotec | F01D 5/141 416/223 A |
| 8,684,698 B2* | 4/2014 | Breeze-Stringfellow | F01D 5/141 416/223 A |
| 2003/0215325 A1 | 11/2003 | Tsuchiya et al. | |
| 2004/0170502 A1 | 9/2004 | Talbotec et al. | |
| 2010/0054946 A1* | 3/2010 | Orosa | F04D 29/324 416/223 R |

OTHER PUBLICATIONS

Kevin E. Turner, et al., "Airfoil Deflection Characteristics During Rub Events", Journal of Turbomachinery, vol. 134, No. 1, XP 055057872, Jan. 2012, pp. 011018-1-011018-8.

Robin J. Williams, "Simulation of Blade Casing Interaction Phenomena in Gas Turbines Resulting From Heavy Tip Rubs Using an Implicit Time Marching Method", Proceedings of ASME Turbo Expo, Structures and Dynamics, vol. 6, Part B, XP 009168395, Jun. 6-10, 2011, pp. 1007-1016.

Jörg Bergner, et al., "Influence of Sweep on the 3D Shock Structure in an Axial Transonic Compressor", Proceedings of GT2005 ASME Turbo Expo: Power for Land, Sea and Air, XP 055057889, Jun. 6-9, 2005, pp. 1-10.

\* cited by examiner

TURBOMACHINE ROTOR BLADE

BACKGROUND OF THE INVENTION

The present invention relates to the field of turbomachine blades, and more particularly to the field of turbomachine rotor blades.

In the present context, the term "turbomachine" is used to designate any machine in which energy can be transferred between a fluid flow and at least one set of blades, such as for example, a compressor, a pump, a turbine, or a combination of at least two of them. In the description below, the terms "upstream" and "downstream" are defined relative to the normal flow direction of the fluid through the turbomachine.

Such a turbomachine may comprise a plurality of stages, each stage normally comprising two sets of airfoils, namely a set of movable blades and a set of stationary guide vanes. Such a set comprises a plurality of airfoils that are offset from one another in a lateral direction. Typically the airfoils are arranged radially around a central axis A. Thus, such a set forms a rotor when it constitutes a set of moving blades, or a stator when it constitutes a set of guide vanes. The proximal end of each blade relative to the central axis A is normally referred to as its root, while the distal end is normally referred to as its tip. The distance between the root and the tip is known as the blade height. Between its root and its tip, the blade is made up of a stack of aerodynamic profiles extending substantially perpendicularly to a radial Y axis. In this context, the term "substantially perpendicular" means that the plane of each profile may present an angle relative to the radial Y axis that is close to 90°, e.g. lying in the range 60° to 120°.

In such a turbomachine, such a rotor is normally surrounded by a casing. In order to limit flow losses in the rotor, it is typically desirable to limit the radial clearance between the blade tips and the inside walls of the casing. Nevertheless, this reduction in radial clearance gives rise to an increase in the risk of contact between the blade tips and the inside walls of the casing. Such contact can be particularly dangerous if the frequency of contact enters into resonance with the resonant frequency of the blades in bending. This problem has thus given rise to studies such as that described by Kevin E. Turner, Michael Dunn, and Corso Padova under the title "Airfoil deflection characteristics during rub events" in "ASME Turbo Expo 2010: Power for land sea and air", Jun. 14-18, 2010, Glasgow, UK, and that described by Robin J. Williams under the title "Stimulation of blade casing interaction phenomenon in gas turbines resulting from heavy tip rubs using an implicit time marching method", in "ASME Turbo Expo 2011", Jun. 6-10, 2011, Vancouver, British Columbia, Canada.

Simultaneously, for aerodynamic reasons, in order to increase the efficiency of compressors and fans, and in particular those reaching transonic flow speeds, forwardly-swept blades have been proposed, e.g. in US patent application US 2010/0054946 A1, and also in the study entitled "Influence of sweep on the 3D shock structure in an axial transonic compressor", described by Jörg Bergner, Stephan Kablitz, Dietmar K. Hennecke, Harald Passrucker, and Erich Steinhardt in ASME Turbo Expo 2005: Power for land sea and air", of Jun. 6-9, 2005, at Reno-Tahoe, Nev., USA.

Nevertheless, for geometrical reasons, forwardly-swept blades can present behavior that is particularly negative in the event of making contact with the casing. As a result of their shapes, the lateral deflection caused by such contact can worsen the phenomenon of dynamic self-engagement.

French patent application FR 2 851 798 A1 discloses a rotor blade having a distal segment that is swept back between the blade tip and an intermediate segment that presents forward sweep over a large portion of the blade height. The backward sweep of the distal segment in such a configuration may serve to reduce the risk of dynamic self-engagement, at least in part.

Object and Summary of the Invention

The present invention seeks to further reduce the risk of dynamic self-engagement in a rotor blade comprising a back-swept distal segment between the blade tip and an intermediate segment that presents forward sweep over at least 50% of the blade height.

In an least one embodiment, this object is achieved by the fact that said distal segment may also present a positive tangential angle of inclination, and in particular a positive tangential angle of inclination that is more pronounced than that of the intermediate segment, thereby contributing together with the backward sweep of the distal segment to limiting interference between the blade tip and the annular casing that is close thereto in the event of the blade being deflected in bending. The terms "tangential angle of inclination" is used in the present context to mean the angle of inclination of a line passing through the centers of gravity CG of successive profiles relative to a radial axis in a direction connecting the blade to the axis of rotation of the rotor. This angle of inclination is considered to be positive if, going towards the blade tip, the blade slopes in the direction of rotation of the blade, and negative if the blade slopes in the opposite direction. By means of these provisions, it is possible to obtain the aerodynamic advantages of forwardly-swept blades without compromising the dynamic response of the blades to contacts with the casing, thus making it possible to maintain small clearance between the blade tips and the casing together with the aerodynamic advantages that stem therefrom. The intermediate segment may also present a positive tangential angle of inclination over at least one zone adjacent to the distal segment.

In addition, said distal segment may in particular be directly adjacent to said blade tip, thereby extending to the blade tip and releasing a larger fraction of the blade height for the forwardly-swept intermediate segment.

In order to reduce interference of the blade tip with the annular casing, the distal segment may occupy at least 5% and preferably at least 8% of the blade height.

Nevertheless, in order to maximize the aerodynamic advantages of the forward sweep, the distal segment need occupy no more than 30% and preferably no more than 15% of the blade height.

The invention also provides a single-piece bladed disk (or "blisk") having a plurality of blades, each having a backwardly-swept distal segment between a forwardly-swept intermediate segment and the blade tip. Such a single-piece bladed disk presents the advantages of being robust and simple. Nevertheless, blades of the invention may alternatively also be blades that are fastened individually, e.g. using a fir-tree fastener member under the blade root.

The invention also provides a compressor or fan rotor having a plurality of blades, each having a backwardly-swept distal segment between a forwardly-swept intermediate segment and the blade tip.

BRIEF DESCRIPTION OF THE DRAWINGS

The invention can be well understood and its advantages appear better on reading the following detailed description of two embodiments shown as non-limiting examples. The description refers to the accompanying drawings, in which.

DETAILED DESCRIPTION OF THE INVENTION

Figure 1:
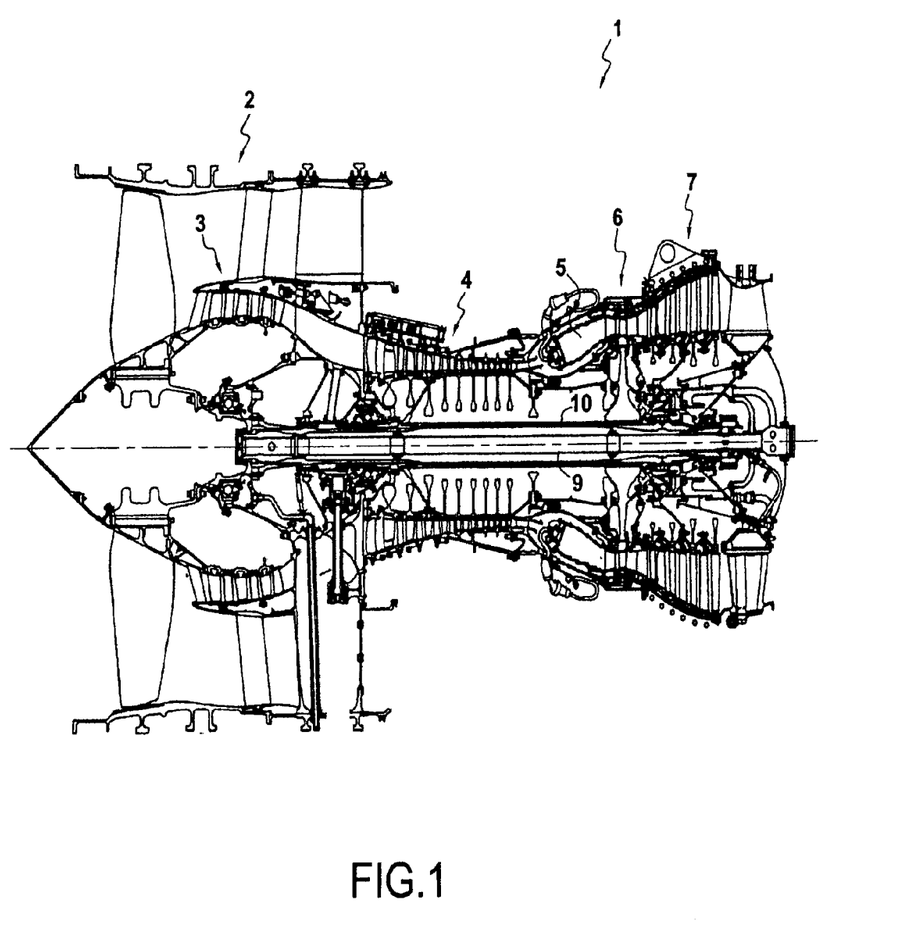
FIG. 1 is a diagrammatic longitudinal section of a turbomachine.

FIG. 1 shows an illustrative example of a turbomachine, and more specifically of an axial-flow turbofan 1. The turbofan 1 shown comprises a fan 2, a low pressure compressor 3, a high pressure compressor 4, a combustion chamber 5, a high pressure turbine 6, and a low pressure turbine 7. The fan 2 and the low pressure compressor 3 are connected to the low pressure turbine 7 by a first transmission shaft 9, while the high pressure compressor 4 and the high pressure turbine 6 are connected together by a second transmission shaft 10. In operation, a flow of air compressed by the low and high pressure compressors 3 and 4 feeds combustion in the combustion chamber 5, with expansion of the combustion gas driving the high and low pressure turbines 6 and 7. By means of the shafts 9 and 10, the turbines 6 and 7 thus drive the fan 2 and the compressors 3, 4. The air propelled by the fan 2 and the combustion gas leaving the turbojet 1 via a thrust nozzle (not shown) downstream from the turbines 6 and 7 exert reaction thrust on the turbojet 1, and thus on a vehicle such as an airplane (not shown).

Figure 2A:
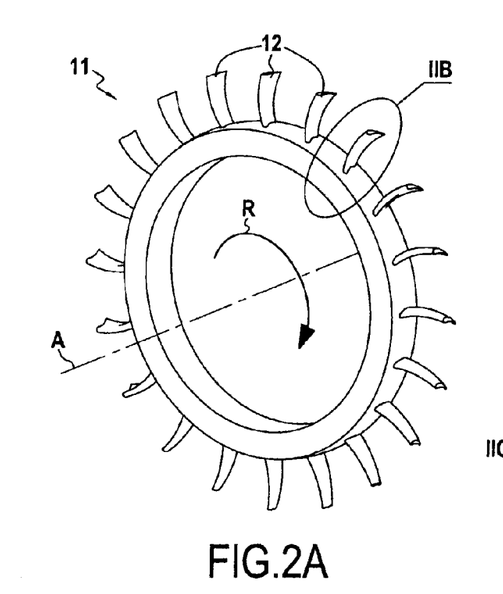
FIG. 2A is a diagrammatic perspective view of a turbomachine rotor.

Each compressor 3, 4 and each turbine 6, 7 of the turbojet comprises a plurality of stages, each stage being formed by a stationary set of vanes or "stator", and a rotary set of blades or "rotor". An axial compressor rotor 11 is shown diagrammatically in FIG. 2A. The rotor 11 has a plurality of blades 12 arranged radially around the axis of rotation A of the rotor 11, which axis is substantially parallel to the general flow direction of the working fluid through the turbojet 1. The blades 12 may be incorporated as a single piece with the rotor 11, thus forming a single-piece bladed disk, or else they may be formed separately and be attached to the rotor by fastener means that are generally known in the state of the art, such as fir-tree fastenings.

Figure 2B:
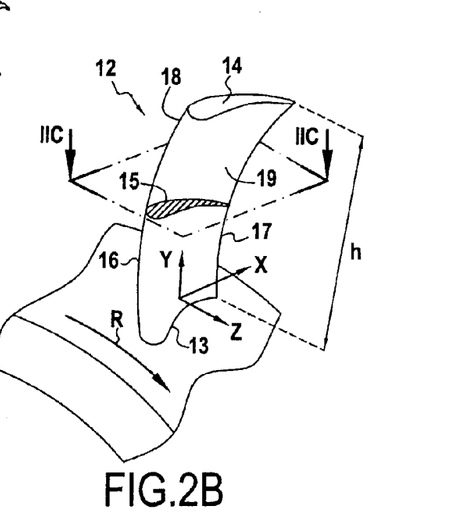
FIG. 2B is a diagrammatic perspective view of a detail of the FIG. 2A rotor.

As shown in greater detail in FIG. 2B, each blade 12 presents a three-dimensional reference system having three orthogonal axes X, Y, and Z. The axis X is parallel to the axis of rotation A of the rotor 11, the axis Z is tangential to the direction of rotation R of the blades 12 about the axis of rotation A, and the axis Y is a radial axis in a direction that intersects the axis of rotation A. Each blade 12 comprises a blade root 13 and a blade tip 14 that are spaced apart by a blade height h in the direction of the radial axis Y. Between the blade root 13 and the blade tip 14, the blade 12 comprises a stack of aerodynamic profiles 15 in planes perpendicular to the radial axis Y, forming a leading edge 16 in the upstream direction, a trailing edge 17 in the downstream direction, a suction side 18, and a pressure side 19. In a compressor or fan rotor, the direction of rotation R in normal operation is such that each blade 12 moves towards its pressure side 19.

Figure 2C:
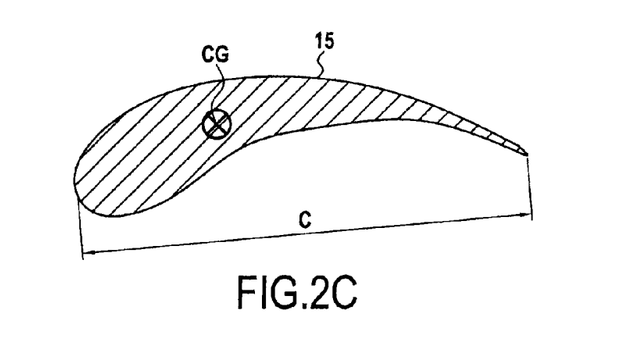
FIG. 2C is a cross-section view of one of the blades of the FIG. 2A rotor shown on plane IIC-IIC.
Figure 3A:
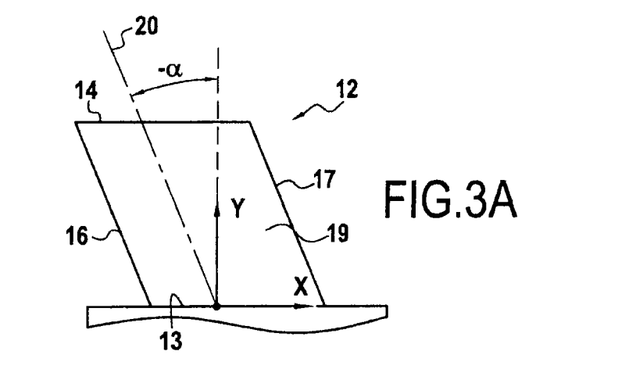
FIG. 3A shows a rotor blade that is swept forwards.
Figure 3B:
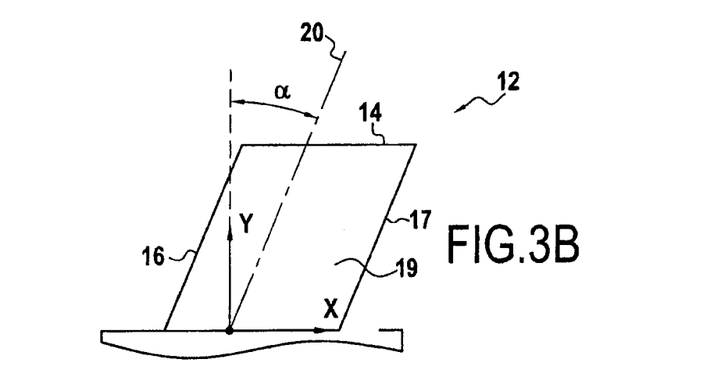
FIG. 3B shows a rotor blade that is swept backwards.
Figure 3C:
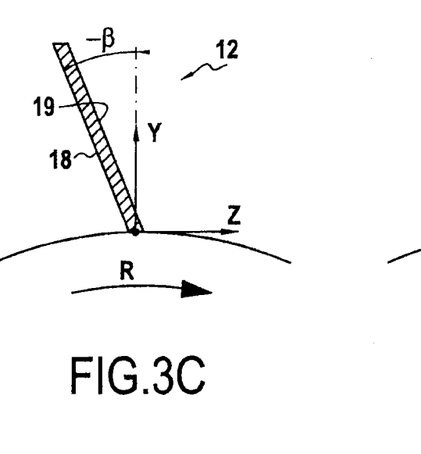
FIG. 3C shows a rotor blade presenting a tangential angle of inclination that is negative.
Figure 3D:
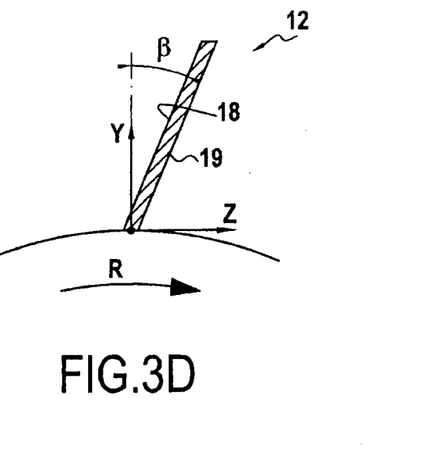
FIG. 3D shows a rotor blade presenting a tangential angle of inclination that is positive.

One such profile 15 of the blade 12 is shown in FIG. 2C. Each profile 15 presents a chord C between the leading edge 16 and the trailing edge 17, and a center of gravity CG defined as the geometrical barycenter of the profile 15. In the field of turbomachine blades, the angle of inclination of the line passing through the centers of gravity CG of successive profiles 15 relative to the radial axis Y is used for defining the sweep and the tangential angle of inclination of a blade 12. Thus, when, on going towards the blade tip 14, this line 20 presents an angle of inclination $-\alpha$ in the upstream direction in the XY plane, as shown in FIG. 3A, the blade 12 presents forward sweep. In contrast, when this line 20 presents an angle of inclination $\alpha$ in the downstream direction in the same plane, as shown in FIG. 3B, the blade 12 presents backward sweep. In similar manner, the tangential angle of inclination is defined by the angle of inclination between the line 20 and the radial axis Y in the ZY plane. Thus, when the line 20 is inclined towards the suction side 18 on going towards the blade tip 14 (and is thus inclined in the direction opposite to the direction of rotation R of the rotor), the blade 12 presents a tangential angle of inclination $-\beta$ that is negative, as shown in FIG. 3C. In contrast, when this angle of inclination is towards the pressure side 19 (and thus in the same direction as the direction of rotation R of the rotor), the blade 12 presents a tangential angle of inclination $\beta$ that is positive, as shown in FIG. 3D. Apart from the sweep and the tangential angle of inclination, turbomachine blades generally present shapes that are complex, with profiles 15 presenting an angle of attack, camber, thickness, and chord C that can also vary along the axis Y.

In the prior art, and in particular for the rotor blades of compressors and fans, it has been found that a configuration with forward sweep presents aerodynamic advantages, in particular when operating in the transonic range. Nevertheless, such a configuration can also present mechanical drawbacks, in particular in the event of the blade tip coming into contact with a casing surrounding the rotor. As can be seen in FIG. 1, the clearance that is generally available between the blade tips of fan rotors 2 and of compressors 3, 4 and the casings respectively of the fan and of the compressors is very limited. Specifically, such clearance leads to aerodynamic losses at the blade tips causing significant losses in the overall efficiency of the turbomachine. They therefore need to be reduced, thereby, in contrast, increasing the probability of contact being made between the blade tips and the casing as a result of vibration or as a result of deformation in the turbomachine. Such contact leads to a transient force on the blade in bending, and even if the casing presents a wear zone for reducing this force, periodic contact at a frequency close to a resonant frequency of the blade in bending can lead to resonance, and even possibly to rupture of the blade.

Figure 4:
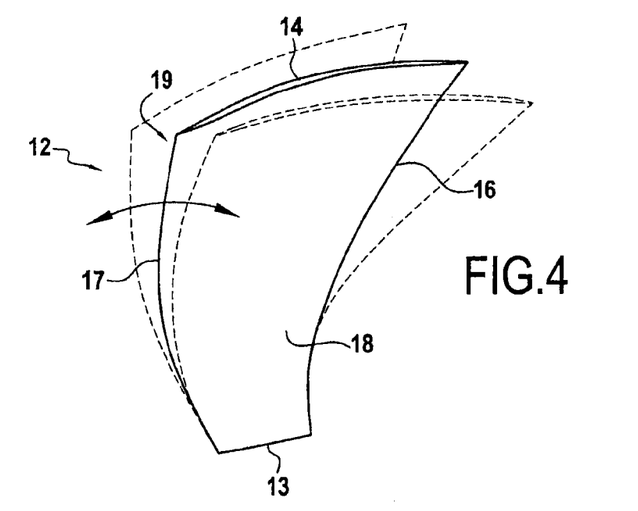
FIG. 4 is a diagram showing the vibration of a blade in bending after making contact with the casing.

That phenomenon is more pronounced on blades with forward sweep, since with that shape the deflection of a blade after a first contact runs the risk of making subsequent contacts worse. This deflection of a blade 12 with forward sweep in a first mode of vibration in bending is shown diagrammatically in FIG. 4, where it can be seen how the offset in the upstream direction of the blade tip 14 relative to the blade root 13 can worsen contact between the blade tip 14 and a casing when the blade 12 enters into vibration.

Figure 5:
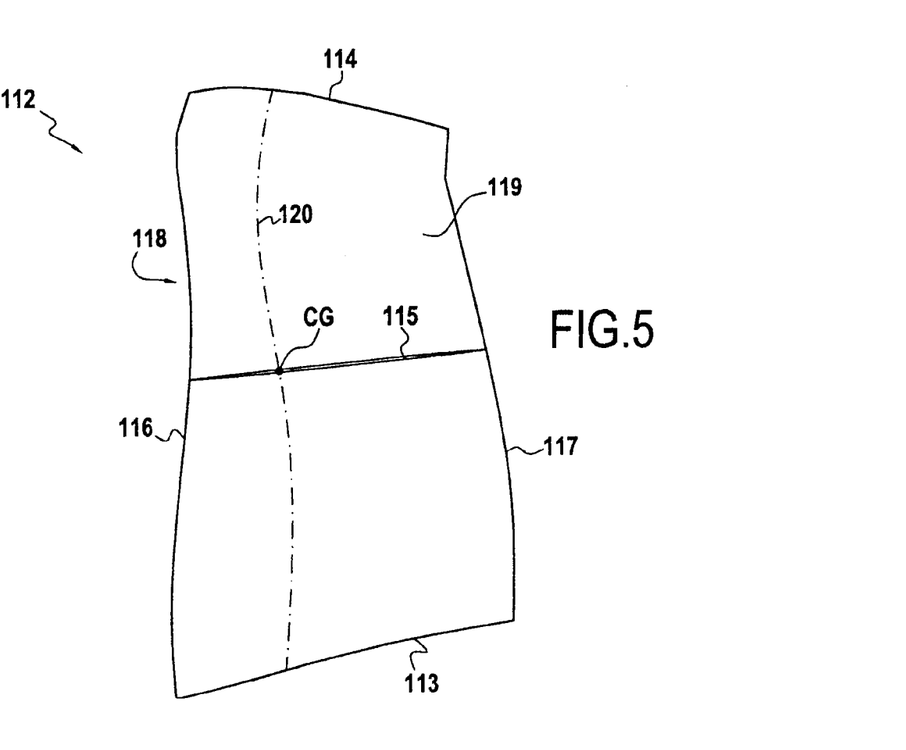
FIG. 5 is a perspective view of a turbomachine blade in a first embodiment of the invention.

FIG. 5 shows another blade 112 in a first embodiment of the invention that makes it possible to mitigate this drawback of blades with forward sweep. This blade 112 also has a blade root 113, a blade tip 114, a leading edge 116, a trailing edge 117, a pressure side 118, and a suction side 119, and it is also made up of a stack of aerodynamic profiles 115 over the blade height h between the blade root 113 and the blade tip 114. Nevertheless, between the blade tip 114 and an intermediate segment 112a with forward sweep that occupies approximately 65% of the blade height h, this blade 112 presents a distal segment 112b with backward sweep occupying about 10% of the blade height h. This backward sweep of the distal segment 112b thus reduces the offset of the blade tip 114 in the upstream direction relative to the blade root 113. Furthermore, in this first embodiment, the distal segment 112b also presents a positive tangential angle of inclination that is substantially greater than that of the intermediate segment 112a.

Figure 6A:
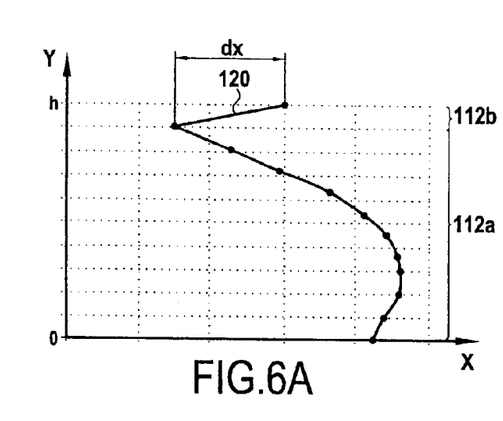
FIG. 6A is a diagram showing how the sweep of the FIG. 5 blade varies between the root and the tip of the blade.

FIG. 6A shows the projection onto an XY plane of the line 120 interconnecting the centers of gravity CG of the profiles 115 of this blade 112. In order to see more clearly how the position of the line 120 varies, distances along the X axis are exaggerated relative to distances along the Y axis. It can thus be seen how the blade presents forward sweep over an intermediate segment 112a occupying approximately 65% of the blade height h, followed by backward sweep over the distal segment 112b situated between the intermediate segment 112a and the blade tip 114. Thus, in this distal segment 112b, the line 120 moves back through a distance dx along the X axis of about 1.75% of the blade height h, thereby reducing the offset of the blade tip 114 in the upstream direction, and thus reducing the risk of the blade 112 suffering dynamic self-engagement following a first contact with the casing.

Figure 6B:
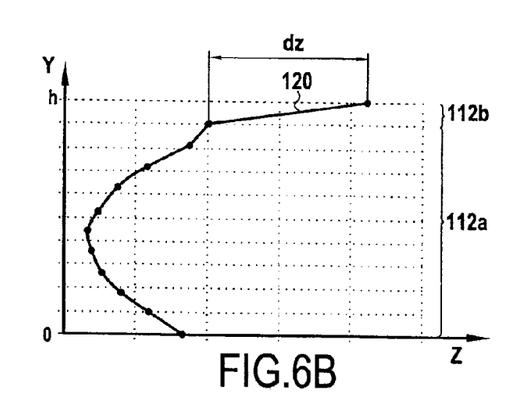
FIG. 6B is a diagram showing how the tangential angle of inclination of the FIG. 5 blade varies between the root and the tip of the blade.

FIG. 6B shows the projection of the same line 120 onto a ZY plane, thus showing the positive tangential angle of inclination β that is substantially more pronounced over the distal segment 112b than over the intermediate segment 112a. In order to see more clearly how the position of the line 120 varies, distances along the Z axis are likewise exaggerated relative to distances along the Y axis. As a consequence of this more pronounced positive tangential angle of inclination, the line 120 advances towards the pressure side through a distance dz along the Z axis that is equal to about 4% of the blade height h, thus contributing in this way to reducing the risk of dynamic self-engagement of the blade 112.

Figure 7A:
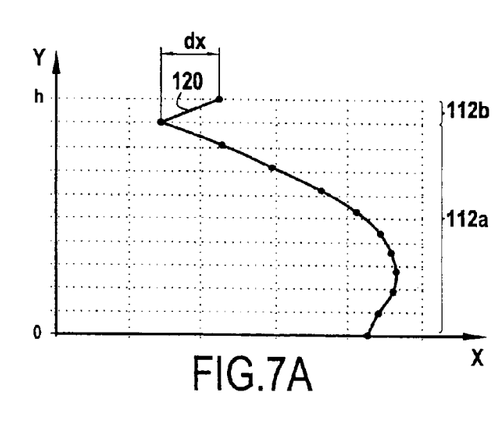
FIG. 7A is a diagram showing how the sweep of a blade in a second embodiment varies between the root and the tip of the blade.
Figure 7B:
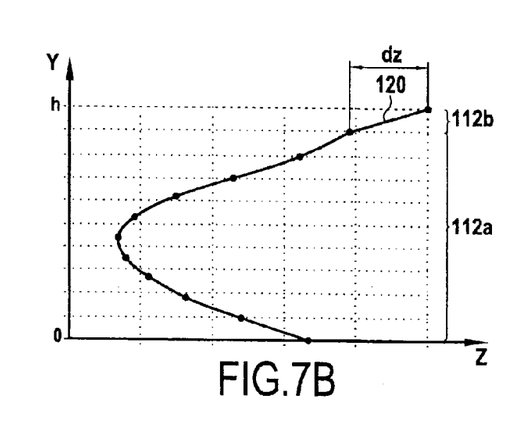
FIG. 7B is a diagram showing how the tangential angle of inclination of the blade of the second embodiment varies between the root and the tip of the blade.

Nevertheless, in other embodiments, the positive tangential angle of inclination over the distal segment need be more pronounced over only at least one zone of the intermediate segment adjacent to the distal segment. Thus, FIGS. 7A and 7B show a line 120 connecting together the centers of gravity of the profiles of a blade in a second embodiment as projected in the same way respectively onto the XY and ZY planes. As in the first embodiment, this blade presents forward sweep over an intermediate segment 112a occupying approximately 65% of the blade height h, followed by a backward sweep over the distal segment 112b situated between the intermediate segment 112a and the blade tip. Thus, as shown in FIG. 7A, in the distal segment 112b, the line 120 moves back through a distance dx along the X axis equal to about 1.25% of the blade height h, thus reducing the offset of the blade tip in the upstream direction, and thus reducing the risk of dynamic self-engagement of the blade following a first contact with a casing. Nevertheless, as shown in FIG. 7B, in this embodiment the positive tangential angle of inclination β is not significantly more pronounced over the distal segment 112b than over a zone adjacent to the intermediate segment 112a.

Although the present invention is described with reference to specific embodiments, it is clear that various modifications and changes may be made to those embodiments without going beyond the general scope of the invention as defined by the claims. For example, in various embodiments, the backward sweep of the distal segment may cause the center of gravity of the blade profiles to move back along the X axis through a distance of up to 5% of the blade height, depending on the embodiment. The offset of the blade profiles along the Z axis as a result of the positive tangential angle of inclination of the distal segment may also be up to 7% of the blade height depending on these various embodiments. In addition, individual characteristics of the various embodiments mentioned may be combined in additional embodiments. Consequently, the description and the drawings should be considered in a sense that is illustrative rather than restrictive.

The invention claimed is:

1. A turbomachine rotor blade comprising:
   a blade root and a blade tip spaced apart by a blade height;
   at least one intermediate segment between the blade root and the blade tip that presents forward sweep over at least 50% of the blade height; and
   a distal segment with backward sweep between the at least one intermediate segment and the blade tip, the distal segment also presenting, from the at least one intermediate segment to the blade tip, a positive tangential angle of inclination in a direction of rotation of a rotor.

2. A turbomachine rotor blade according to claim 1, wherein the distal segment presents a positive tangential angle of inclination, in the direction of rotation of the rotor, that is more pronounced than that of the at least one intermediate segment.

3. A turbomachine rotor blade according to claim 1, wherein the at least one intermediate segment also presents a positive tangential angle of inclination, in the direction of rotation of the rotor, over at least one zone adjacent to the distal segment.

4. A turbomachine rotor blade according to claim 1, wherein the distal segment occupies at least 5% of the blade height.

5. A turbomachine rotor blade according to claim 4, wherein the distal segment occupies at least 8% of the blade height.

6. A turbomachine rotor blade according to claim 1, wherein the distal segment occupies no, more than 30% of the blade height.

7. A turbomachine rotor blade according to claim 6, wherein the distal segment occupies no more than 15% of the blade height.

8. A single-piece bladed disk comprising a plurality of blades according to claim 1.

9. A compressor rotor comprising a plurality of blades according to claim 1.

10. A fan rotor comprising a plurality of blades according to claim 1.

* * * * *